United States Patent
Laoratanakul et al.

(10) Patent No.: US 11,597,819 B2
(45) Date of Patent: Mar. 7, 2023

(54) MATERIALS COMPRISING TEXTILE DEBRIS AND LATEX BASED BINDER

(71) Applicant: SAI CYCLE LIMITED, Hong Kong (HK)

(72) Inventors: Pitak Laoratanakul, Bangkok (TH); Sanjeev Madan Bahl, New York, NY (US); Pinyada Ninkamhang, Bangkok (TH)

( * ) Notice: Subject to any disclaimer, the term of this patent is extended or adjusted under 35 U.S.C. 154(b) by 278 days.

(21) Appl. No.: 16/550,518

(22) Filed: Aug. 26, 2019

(65) Prior Publication Data

US 2020/0199333 A1  Jun. 25, 2020

Related U.S. Application Data

(60) Provisional application No. 62/784,585, filed on Dec. 24, 2018.

(51) Int. Cl.

| | |
|---|---|
| *C08L 7/00* | (2006.01) |
| *C08K 5/098* | (2006.01) |
| *C08K 5/205* | (2006.01) |
| *C08K 3/22* | (2006.01) |
| *C08K 3/013* | (2018.01) |
| *C08K 5/00* | (2006.01) |
| *C08K 3/06* | (2006.01) |
| *B29C 70/34* | (2006.01) |
| *B29C 43/52* | (2006.01) |
| *B29C 43/58* | (2006.01) |
| *C08K 11/00* | (2006.01) |

(52) U.S. Cl.
CPC ............... *C08L 7/00* (2013.01); *B29C 43/52* (2013.01); *B29C 43/58* (2013.01); *B29C 70/34* (2013.01); *C08K 3/013* (2018.01); *C08K 3/06* (2013.01); *C08K 3/22* (2013.01); *C08K 5/005* (2013.01); *C08K 5/098* (2013.01); *C08K 5/205* (2013.01); *C08K 11/005* (2013.01); *B29C 2043/5808* (2013.01); *B29C 2043/5816* (2013.01); *C08K 2003/2217* (2013.01); *C08K 2003/2241* (2013.01); *C08K 2003/2296* (2013.01); *C08L 2312/00* (2013.01)

(58) Field of Classification Search
CPC .. C08L 7/00; C08K 3/06; C08K 5/005; C08K 11/005; C08K 2003/2241

USPC .......................................................... 524/418
See application file for complete search history.

(56) References Cited

U.S. PATENT DOCUMENTS

| | | | | |
|---|---|---|---|---|
| 3,305,522 A | * | 2/1967 | Spacht | .................... C08K 5/13 |
| | | | | 524/324 |
| 4,863,979 A | | 9/1989 | Beyersdorf | |
| 4,963,603 A | | 10/1990 | Felegi | |
| 5,395,879 A | * | 3/1995 | Murray | .................. C09J 121/02 |
| | | | | 524/270 |
| 6,127,476 A | | 10/2000 | Matsukura | |
| 80,926,489 | | 1/2012 | Nunn | |
| 2008/0200086 A1 | | 8/2008 | Porter | |
| 2009/0163102 A1 | | 6/2009 | Draplea | |
| 2013/0005209 A1 | | 1/2013 | Andersen | |
| 2016/0215421 A1 | | 7/2016 | Samsøe | |
| 2018/0044825 A1 | | 2/2018 | Samsøe | |

FOREIGN PATENT DOCUMENTS

| | | |
|---|---|---|
| TH | 0701000589 | 2/2007 |
| TH | 1103000520 | 5/2011 |
| TH | 1301002135 | 4/2013 |
| WO | 01/32405 A1 | 5/2001 |
| WO | 01/81056 A1 | 11/2001 |
| WO | 2011/068399 A1 | 6/2011 |

OTHER PUBLICATIONS

Wang (Fiber and Textile Waste Utilization, Waste Biomass Valor (2010) 1:135-143) (Year: 2010).*

* cited by examiner

*Primary Examiner* — Doris L Lee
(74) *Attorney, Agent, or Firm* — Haug Partners LLP

(57) ABSTRACT

A composite material having physical characteristics equivalent to particle board materials bonded with resin-based adhesives that contain formaldehyde-urea is formed of reclaimed textile debris comprising fabric scraps and a latex based binder. The binder includes natural rubber latex, sulfur, an anti-oxidant agent and pH adjustment substances. The binder may also include selected amounts of zinc oxide, zinc diethyldithiocarbamate and a stabilizer. Production of the composite material includes mixing the constituents and vulcanization through the application of heat and compression. Cold compression is subsequently applied.

20 Claims, 2 Drawing Sheets

MATERIALS COMPRISING TEXTILE DEBRIS AND LATEX BASED BINDER

PRIORITY CLAIM

This application claims priority to U.S. Provisional Application Ser. No. 62/784,585 filed Dec. 24, 2018, the contents of which is hereby incorporated by reference herein.

BACKGROUND OF THE INVENTION

1. Field of the Invention

This invention relates generally to composite materials formed of a textile debris mixture and more specifically to materials wherein a textile debris mixture is bonded with adhesives made from natural rubber latex.

2. Antecedents of the Invention

Millions of tons of fabric fiber and textile waste have been dumped each year. Rag is a type of solid waste that is difficult to degrade, produces carbon dioxide if burned as fuel and does not readily decompose in a landfill. Although small amounts of fabric fiber and textile have been reused or recycled as stuffing in furniture or dolls, etc., only biodegradable natural fibers are suitable as fuel or landfill reclamation, etc., while manmade fiber constituents of textile debris contribute to toxic pollution.

In the past, adhesives containing formaldehyde-containing resin were used as a binder for recycling materials such as rubber wood, pine, etc. in order to use wood chips and scrap in furniture and other products.

Thai patent application No. 1301002135 revealed a plywood material made from thin rubber wood slabs reinforced with layers of glass fiber cloth by using epoxy adhesives containing silane compounds between layers and pressed to compress with heat and pressure as specified.

Thai Patent No. 7451, (request No. 1103000520) by Miss Prinda Taevijitsilp, entitled: Sheets By Waste Materials disclosed the manufacture of compressed sheets from debris materials, such as plant leaves, rubber foam, plastic scrap as well as rag, by using polymer adhesives such as diphenyl methane diocyanate or urea adhesives as melamine formaldehyde plus heat. The debris material and formaldehyde adhesive was compressed into the sheets for use in lieu of wood. However, formaldehyde-urea adhesive has a high vapor evaporation rate. As a result the environment and consumers have been exposed to toxic fumes both in the production process and in the form of finished products.

As a result, attempts have been made to use a binder made from natural and non-hazardous materials such as rubber or latex. The binder was mixed with textile debris materials and the mixture compressed with heat to obtain non-toxic material. Inorganic additives such as calcium, silica or alumina, catalysts, stimulants, hardness and mechanical strength additives, color pigments and flame retardants, etc. have been added to increase the physical and mechanical properties of composite materials.

Thai Patent application No. 100274, (request No. 0701000589), entitled: Formula, Material and Production Process of Natural Rubber Mixed With Wood Sawdust by Siam United Rubber Co., Ltd., King Mongkut's University of Technology Thonburi and the Office of Research Fund disclosed wood sawdust powder mixed with natural rubber and various additives such as a flame retardant, etc. to adjust the properties of the product. The mixture was hot extruded into the roofs and coated with urethane.

Thai Patent application No. 131263, (request No. 0901004008, entitled: Sheet-making Process From Fabric by Mr. Yuttana Anothaisintavee disclosed a method wherein fabric debris is chopped into rough pieces, size 1-15 square centimeters, then remove the rag that has been mixed with PMDI (Polymeric Diphenyl Methane Di-isocyanate) and adjust the properties with other substances such as flame retardants, moisture-resistant substances, etc. The mixture is then formed into sheets by mechanical methods including placement into molds and compression under heat to form composite sheets. The isocyanate constituent of the PDMI is an inorganic substance that is volatile and difficult to degrade. The vapor of this type of glue is toxic to the respiratory system, harmful to the user, the environment and the worker.

Rubber or latex is a natural substance that contains proteins making it easy to degenerate. Rubber is a non-polar substance while fiber debris and adhesives are polar substances. Heretofore, when fiber debris was bonded with adhesives containing rubber, weak mechanical bonding resulted between the adhesives and the fabric fibers. In addition, there existed the problem of infiltration (wettability) between the rubber or latex based binder and any inorganic additives as well as between rubber and the fabric fibers. As such, the use of rubber as a binder did not result in a stable strong composite material.

U.S. Pat. No. 6,127,476 entitled: Aqueous Rubber Composition, disclosed adhesives containing carboxylate latex, which are made from natural rubber latex, styrene, butadiene, unsaturated monomer acid, sulfur and a catalyst for binding a rubber substrate to fabric. According to this patent, adhesives do not contain hydrocarbon solvents or tackifiers and have the high peel resistance. While the adhesives were suitable for use with bonding rubber sheets or rubber to fabric, such as the manufacture of tennis balls, etc., but the adhesives were not suitable for use with interlocking composite materials that require high strength and durability.

From the foregoing disadvantages, it can be seen that there is the need to provide composite materials having high strength and durability from a mixture of textile debris and an environmentally sound binder as well as methods of producing such materials.

SUMMARY OF THE INVENTION

A composite material is fabricated from textile debris such as fabric scraps, fabric fibers and a binder comprising natural rubber latex and sulfur in the amount sufficient for vulcanization together with zinc, an antioxidant agent, zinc oxide, a stabilizing agent and pH adjustment substances. The production of such composite material employs heat and cold compression, which results in a material having physical properties equivalent to particle board materials fabricated with resin-based adhesives that contain formaldehyde-urea.

From the foregoing compendium it will be appreciated that an aspect of the present invention is to provide composite materials of the general character described which are not subject to the aforementioned disadvantages of the antecedents of the invention.

A feature of the present invention is to provide composite materials of the general character described having high strength and durability comprising a mixture of textile debris and a natural rubber latex binder.

A consideration of the present invention is to methods for producing composite materials with high strength and durability using natural binders that are less toxic to the environment than formaldehyde-urea binders.

Another aspect of the present invention is to provide composite materials of the general character described including Textile debris; and binders that are combined with:

| | |
|---|---|
| Natural rubber latex | 100 parts |
| Sulfur | 0-1.0 parts |
| Zinc diethyldithiocarbamate | 0-1.0 parts |
| Antioxidant | 0.1-1.0 parts |
| Zinc oxide (ZnO) | 0-5.0 parts |
| Stabilizer | 0-1.0 parts and |
| pH adjustment substance | 0.1-1.0 parts |

In addition, stabilizing substance in adhesives may be selected from derivatives of amines and phenols either or combining.

Composite materials, which the adhesives are included with color pigment fillers, magnesium oxide and fillers, may be selected from groups of calcium carbonate, titanium dioxide, silica, synthetic fibers and natural fibers either or combining.

In addition, stabilizing substance may be potassium laurate (K-laurate) and pH adjustment substance may be potassium hydroxide (KOH).

The fabric fibers may be combined with fabric fibers that are chopped into small pieces with fiber lengths in the range (a) 0.5-1.0 cm, (b) 1.0-2.0 cm and (c) 2.0-3.0 cm with fiber ratio (a):(b):(c) equal to 1:1:1 to 1:2:4.

Another feature of the present invention is to provide composite materials of the general character described including textile debris; and binders that are combined with:

| | |
|---|---|
| Natural rubber latex (30-65% rubber) | 100 parts |
| Sulfur | 0-1.0 parts |
| Zinc diethyldithiocarbamate | 0-1.0 parts |
| Lowinox ® CPL | 0-2.0 parts |
| Zinc oxide (ZnO) | 0-5.0 parts |
| Titanium dioxide (TiO2) | 0-10.0 parts |
| Potassium laurate (K-laurate) | 0.1-1.0 parts and |
| Potassium hydroxide (KOH) | 0.1-1.0 parts |

A further consideration of the present invention is to provide a method of producing composite materials of the general character described including:

Preparation of textile debris with the size and shape according to the specified proportion in advance;

Mixing of textile debris and binder together with the preset ratio in advance with blender at speed of 10-30 rounds per minute for 5-20 minutes;

Making the mixture of textile debris and binder crosslink in the mold under the pressure of 3,000 to 6,000 psi at temperatures of 80-180° C. for 10-30 minutes;

Pressing the mixture of textile debris and binder in the mold by the cold press machine with compressive strength between 3,000-6,000 psi for 60-360 minutes; and Removing composite materials from molds Yet another aspect of the present invention is to provide a method of producing composite materials of the general character described including:

Preparation of textile debris with the size and shape according to the specified proportion in advance Mixing of textile debris and binder together with the ratio of binder to textile debris 10-60% by weight with blender at speed of 10-30 rounds per minute for 5-20 minute;

Reducing moisture of the good blending of textile and binder to 0-5% moisture content by heating process between a temperature of 40-70 degrees Celsius;

Mincing the dried ingredients from the previous step into small pieces with different fiber lengths in the range (a) 0.5-1.0 cm, (b) 1.0-2.0 cm and (c) 2.0-3.0 cm;

Mixing the ingredients (a), (b) and (c) that have been minced from the previous step with the proper ratio to control the fibers dispersion and adhesion with the proportion ratio (a):(b):(c) in the range between 1:1:1 to 1:2:4;

Making the mixture of textile debris and binder crosslink in the mold under the pressure of 3,000 to 6,000 psi at temperatures of 80-180° C. for 10-30 minutes;

Pressing the mixture of textile debris and binder in the mold by the cold press machine with compressive strength between 3,000-6,000 psi for 60-360 minutes; and Removing composite materials from molds In addition, the composite materials production process may also be included the composite materials cutting process to the desired size and the composite materials improving surface, too.

Other aspects, features and considerations of the present invention in part will be obvious and in part will be pointed out hereinafter.

With these ends in view, the invention finds embodiment in various combinations of elements, arrangements of parts and series of steps by which the above-mentioned aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings, wherein some of the various possible exemplary embodiments of the invention are shown.

DESCRIPTION OF THE INVENTION

Description about this invention will be done by providing examples of the invention and referred by using the figures as the examples to make the clearer description. The same parts in these figures are represented by the same reference number which is not limited in any way and the scope of the invention will follow the rights attached at the end.

Figure 1:
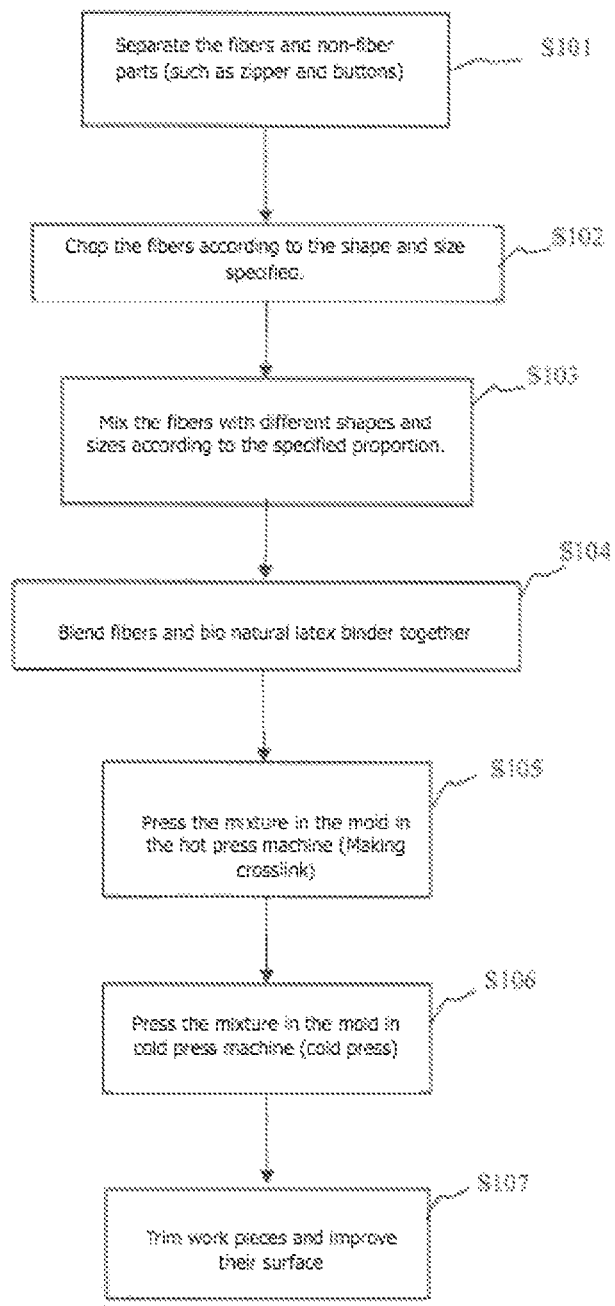
FIG. 1 comprises a flow chart of the composite materials production process in one embodiment of the invention.

According to FIG. 1 that shows the composite materials production process from textile which consists of the following steps:

Fabric Fiber Preparation (S101-S102)

In the process of S101, the collection of textile waste in the form of used fabric or fabric from the garment manufacturing industry is separated to the fiber and the non-fiber parts, especially metal accessories such as buttons or metal/plastic zipper from the fabrics by using the metal separator device or manual sorting.

In the process of S102, the textile fibers are minced into small pieces with different fiber lengths in different groups, i.e. group (a) 0.5-1.0 cm, group (b) 1.0-2.0 cm and group (c) 2.0-3.0 cm.

Mixing Fibers and Adhesives (S104)

Fibers of group (a), (b) and (c) are mixed at the appropriate ratio to control the fibers dispersion and adhesion which determines the hardness, bending strength and the final product quality consistency. Examples of the appropriate fiber ratio (a), (b) and (c) are 1:1:1 to 1:2:4.

The fiber mixture is then placed in a rotary blender and 10-60% bio-natural rubber adhesion by weight is added, depending on the thickness and properties of the composite material from the desired textile.

An example of a binder made from bio-natural rubber latex includes:

| Ingredients | Proportion per 100 rubber volume (PHR) |
|---|---|
| Natural rubber latex (30-65% rubber) | 100 |
| Sulfur | 0-1.0 |
| Zinc diethyldithiocarbamate (ZDEC) | 0.1-1.0 |
| Lowinox ® CPL is an antioxidant | 0.1-2.0 |
| Zinc oxide (ZnO) | 0-5.0 |
| Titanium dioxide (TiO2) (Option) | 1.0-10.0 |
| Potassium laurate (K-laurate) is a stabilizer | 0.1-1.0 |
| Potassium hydroxide (KOH) is a pH regulator | 0.1-1.0 |

* PHR—Part per Hundred Rubber is the amount of chemicals compared to 100 natural rubber.

PHR—Part per Hundred Rubber is the amount of chemicals compared to 100 natural rubber.

The natural rubber latex used should have rubber content in the range 30-65%

Sulfur is a substance that is used to cause the reaction in the vulcanization process which will help prevent latex from dissolving in organic solvents by making the natural rubber cross-linking up in the structure and will help increase the condition of wettability between natural rubber and the original inorganic substances and fabric fibers/textile scraps. The infiltration conditions can be adjusted by reducing the amount of sulfur as well as changing the mixing parameters such as stirring speed, time and temperature.

Antioxidant agents can be selected from (but not limited to) groups that comprise either or in combination of amine derivatives, phenols and phenol derivatives.

Amine derivatives, such as N-isopropyl-N-"phenyl-p-phenylenediamine, N-413-dimethylbutyl-N"" phenylp-phenylenediasmine, 2,2,4-Trimethyl-1,2-dihydroquinoline, and etc.

Phenol derivatives, including 2,6 Di-tert-bytyl (-p-cresol), (poly (dicyclopentaclient-co-peresol), 4,4'-bytylidene-bis-(2-tertarylbutyl-5-methylphenol), and etc.

A phenolic antioxidant may be present and include a soluble antioxidant such the polymeric sterically hindered phenol (Lowinox CPL) (CAS No. 68610-51-5).

Filler for adding properties of composite materials, including either or combination of calcium carbonate, titanium oxide, silica, synthetic fiber and/or natural fibers.

Titanium oxide, when mixed with natural rubber latex, will make the latex white. It can be used as needed.

A polymeric binder material, such as polyurethane water-based binder and/or acrylic water-based binder in the ratio of 10-70 parts per 100 natural rubber latex parts may be added as a binder. The polymeric binder material strengthens the bond and promotes vulcanization with reduced or no sulfur.

To ensure that the mixed ingredients are consistent, the speed and rotation time of the blender should be in the range of 10-30 revolutions per minute with duration of 5-20 minutes.

Crosslinking (S105)

After the mixture is mixed together with the fiber and binder of natural rubber, it is placed into a mold conforming to the size and shape of the desired product in a hot press machine. By controlling the pressure, temperature and duration crosslink between the fabric fibers and the binder can be achieved. The mixture should be compressed within a range of 3,000 to 6,000 psi at a temperature of 80-180 degrees Celsius for 10-30 minutes.

Cold Pressing (S106)

To ensure that the adhesion reaction and maintain the hardness and thickness of the product are in accordance with a specified standard, the hot-pressed molded pieces are repressed in a cold press machine with a compressive force between 3,000-6,000 psi for a period of 60-360 minutes.

Final Finishing (S107)

The cold pressed molded pieces of composite material are removed from the mold and cut to a desired size and trimmed. Other finishing procedures may be employed, such as, smoothing surfaces.

Examples of composite materials based on the above production processes have been tested for bending strength by methods according to ASTM D790, the strength of tightening by means of ASTM 1037, density by method according to ASTM D297, thermal conductivity by ASTM C518 standard method and Hardness Shore A by ASTM D2240 standard method.

The second embodiment of the invention resides in the inventor's discovery that modifying the process by mixing the binder with the textile scraps and then drying the textile scraps soaked with the binder until the moisture content is 5% or less before chopping to the size and shape as specified, makes the mixture of textile scraps and binder more consistent than mixing chopped scraps directly with the binder. The method depicted in FIG. 2 reduces the problem of scraps sticking together, resulting in uneven distribution and dispersal of the textile scraps as they absorb the binder, causing the scraps sticks together in small pieces which requires a lot of time to mix and which consumes more energy in agitation in order to make the textile scraps to absorb the binder thoroughly until each group of textile scraps has a uniform distribution that is homogeneous.

Figure 2:
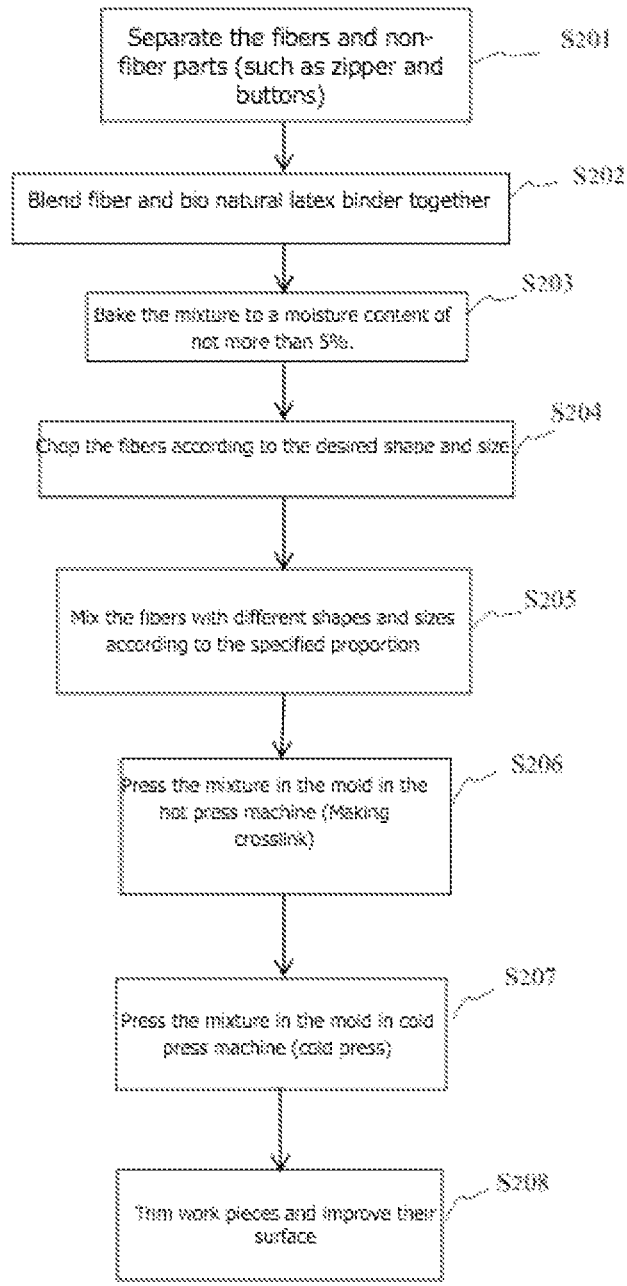
FIG. 2 comprises a flow chart of the composite materials production process in a second embodiment of the invention.

FIG. 2 illustrates the process of producing composite sheet materials from textiles which comprising of the following:

Fabric Fiber Preparation (S201-S203)

As illustrated at S201, the textile scraps in the form of used fabric or fabric obtained from apparel production industry are collected. Then, the fiber and non-fiber components are separated. Metal accessories such as buttons or metal/plastic zippers are removed from the fabric by using a magnetic separator or manual sorting.

In step S202, fiber and binder which has the main ingredient made from natural rubber latex are blended. The binder should have sufficient liquid to ensure that the fibers are thoroughly soaked with the binder. This can be achieved by spinning in a rotary blender as well as by adding 10-60% of bio natural rubber latex binder 10-60%, depending on the thickness and desired properties of the textile composite board. To ensure that the mixture is consistent, the speed and rotation time of the blender should be in the range of 10-30 revolutions per minute for 5-20 minutes.

In step S203 the moisture content of the mixed ingredients is reduced to 05% by heating. For example, drying naturally under the sun or wind or baking with a hot air oven or something similar within the temperature range of 60-100 degrees Celsius, etc., until the moisture content falls within the specified range.

Digesting Binder-Containing Fibers (S204)

In step S204, the textile fibers that are coated with binder and are dried are digested or chopped and separated into small pieces with different fiber lengths in different groups, i.e. group (a) 0.5-1.0 cm, group (b) 1.0-2.0 cm and group (c) 2.0-3.0 cm.

Mixing Binder-Containing Fibers that have been Digested (S205)

Step S205 involves mixing group (a), (b.) and (c) fibers in the appropriate ratio to control the dispersion and adhesion of fibers which determines the hardness, strength and quality, and consistency of the final product. An example of an appropriate ratio of group (a), (b) and (c) fibers is between 1:1:1 to 1:2:4.

Crosslinking in the Mold (S206)

The mixture is then it is placed into a mold conforming to the size and shape of the desired product in a hot press machine. By controlling the pressure, temperature and duration, complete crosslinking between the fabric fibers and the binder can be achieved. The mixture should be compressed within a range of 3,000 to 6,000 psi at a temperature of 80-180 degrees Celsius for 10-30 minutes.

Cold Pressing (S207)

To ensure that the adhesion reaction and to maintain the hardness and thickness of the product to meet specified standards, the hot-pressed work pieces are re-pressed through at cold press process in a cold press machine using compressive strength between 3,000-6,000 psi for a period of 60-360 minutes.

Final Finishing (S208)

The cold pressed molded pieces of composite material are removed from the mold and cut to a desired size and trimmed. Other finishing procedures may be employed, such as, smoothing surfaces.

Composite materials obtained according to the methods described above are solid and have high strength, can be used as a substitute for plywood or MDF flooring to be used to cover walls, partitions, or furniture because they can be shaped as needed.

Examples 1 through 6 below illustrate the properties of the composite materials where the following process and adhere formula are applied.

| Ingredients | Proportion per 100 rubber volume (PHR) |
| --- | --- |
| Natural rubber latex | 100 |
| Sulfur | 0.5 |
| Zinc oxide | 0.1 |
| Zinc diethyldithiocarbamate | 0.1 |
| Lowinox ® CPL | 1.0 |
| Titanium dioxide | 0.1 |
| Potassium laurate | 0.1 |
| Potassium hydroxide | 0.1 |

Example 1 does not contain of any additional binder such as polyurethane or acrylic etc. Examples 2-5 contains polyurethane in the proportion of 10 parts, 30 parts, 50 parts and 70 parts, respectively. Example 6 contains an acrylic binder in the proportion of 70 parts.

Example 1-6 have been done in one layer by extrusion and the material used is the fine chopped textile scraps mixed with the binder and undergone the drying process and hot press process under the pressure of 4000 psi and 100 degree Celsius temperature for 30 minutes and cold press in the mold with 4000 psi pressure for 100 minutes using the mixing ratio and the size of the textile scraps as specified above with the characteristics as shown in FIG. 3.

The composite materials obtained have a smooth surface. The property test of the physical properties of the Examples 1-6 and the control Specimen, which is medium density fiber-board (MDF board) and TIS 876-2547, which is the industry standard for flat type plywood with the density of 400-900 kg/m$^3$ and formaldehyde glue not more than 8 mg/100 g. was used with the thickness 13-20 mm. are shown in the following table.

Test Results

| Example | Flexural Strength (MPa) | Binding Strength (MPa) | Density (kg/m$^3$) | Thermal Conductivity (W/m · K) | Thickness (mm) | Shore A Strength (load 1 kg) |
| --- | --- | --- | --- | --- | --- | --- |
| 1 | 2.30 | 0.21 | 950 | 0.1638 | 15 | 87 |
| 2 | 0.84 | 0.07 | 1,055 | 0.1301 | 9 | 69.4 |
| 3 | 0.91 | 0.09 | 1,074 | 0.1383 | 9 | 72.4 |
| 4 | 1.54 | 0.16 | 1,091 | 0.1392 | 9 | 82.3 |
| 5 | 4.20 | 0.26 | 1,120 | 0.1896 | 9 | 83.1 |
| 6 | 7.12 | 0.97 | 1,079 | 0.0425 | 15 | 83.1 |
| Controlled MDF Specimen | 20 | 0.55 | 690-770 | 0.12-0.15 | 12-19 | — |
| S 876-2547 | >13 | >0.35 | 400-900 | — | 13-20 | — |

Comparison Results

It is found that most Examples had a flexural strength less than 13 MPa, which is lower than the industry standard for general plywood due to the fabric fiber structure and the use of natural rubber latex binder which have a tough bonding structure and more flexible than resin-based binder containing formaldehyde as the basis. Therefore, such work pieces are suitable for applications that do not require a lot of strength, but can increase flexibility or twist well. Thus, it may be suitable for furniture industrial applications because it can be easily formed into various shapes. However, increasing of flexural strength can be done by increasing the quantity of binder such as polyurethane or acrylic.

In Example 6, the binding strength was 0.95 MPa which is higher than the industry standard for plywood, which is at 0.35 MPa. In addition, every Example also exhibited a lower thermal conductivity than general wall decoration materials. In particular, Example 6, which contains an acrylic binder, has a low thermal conductivity, which is close to the heat insulation material used to prevent heat transfer into a building, such as rock wool and thus well suited for use as a thermal insulation material.

It can be seen that composite materials based on fabrication have a mixture of textile scraps and binder with the content of natural rubber latex and artificial materials formed by the inventive method can use recycled materials, resulting in composite materials that are strong and durable, suitable for use as a replacement of natural wood materials, reducing wood cutting and reduce the waste materials such as fabric, textiles etc. It also contains of less toxic natural binder, therefore it has low volatile organic compounds (VOC).

The composite materials are therefore suitable for use as furniture and sheet materials for interior and residential decoration.

The particular combinations of elements and features in the above-detailed embodiments are exemplary only; the interchanging and substitution of these teachings with other teachings in this application are also expressly contemplated. As those skilled in the art will recognize, variations, modifications, and other implementations of what is described herein can occur to those of ordinary skill in the art without departing from the spirit and the scope of the invention as claimed.

Further, in describing the invention and in illustrating embodiments of the invention in the figures, specific terminology, numbers, dimensions, materials, etc., are used for the sake of clarity. However the invention is not limited to the specific terms, numbers, dimensions, materials, etc. so selected, and each specific term, number, dimension, material, etc., at least includes all technical and functional equivalents that operate in a similar manner to accomplish similar purpose. Use of a given word, phrase, number, dimension, material, language terminology, product brand, etc. is intended to include all grammatical, literal, scientific, technical, and functional equivalents. The terminology used herein is for the purpose of description and not limitation.

Having described the preferred embodiments of the invention, it will now become apparent to one of ordinary skill in the art that other embodiments incorporating the concept may be used. Moreover, those of ordinary skill in the art will appreciate that the embodiment of the invention described herein can be modified to accommodate and/or comply with changes and improvements in the applicable technology and standards referred to herein.

The invention claimed is:

1. A molded composite material having a density of 950-1120 kg/m$^3$ comprising textile debris and a binder, the textile debris including fabric scraps, the binder including:

| | | |
|---|---|---|
| natural rubber latex | 100 | Parts |
| sulfur | 0-1.0 | Parts |
| zinc diethyldithiocarbamate | 0-1.0 | Parts |
| antioxidant agent | 0.1-1.0 | Parts |
| zinc oxide (ZnO) | 0-5.0 | Parts |
| stabilizer | 0-1.0 | Parts and |
| pH adjustment substance | 0.1-1.0 | Parts. |

2. The molded composite material according to claim 1 wherein the binder includes a filler comprising a color pigment.

3. The molded composite material according to claim 1 wherein the binder further includes magnesium oxide.

4. The molded composite material according to claim 1 wherein the stabilizer comprises potassium laurate.

5. The molded material according to claim 1 wherein the pH adjustment substance comprises potassium hydroxide (KOH).

6. The molded composite material according to claim 1 wherein the fabric scraps comprise small pieces having fiber lengths in the range of (a) 0.5-1.0 cm (b) 1.0-2.0 cm and (c) 2.0-3.0 cm with fiber ratio (a):(b):(c) is equal to 1:1:1 to 1:2:4.

7. The molded composite material according to claim 1 wherein the binder also includes a polymeric binder in the ratio of 10-70 parts per 100 natural rubber latex parts.

8. The molded composite material according to claim 1 wherein the antioxidant agent is selected from the group consisting of amines derivatives, amines, phenols and phenols derivatives.

9. The molded composite material according to claim 8 wherein the phenols and phenols derivatives comprise phenolic antioxidants or polymeric sterically hindered phenols.

10. The molded composite material according to claim 1 wherein the binder further includes a filler selected from the group consisting of calcium carbonate, titanium dioxide and silica.

11. The molded composite material according to claim 10 wherein the filler is present in an amount of 1.0-10.0 Parts of rubber.

12. A method producing the molded composite material according to claim 1 comprising the steps of:
 a) preparing textile scraps from textile debris by cutting the textile waste into specified sizes;
 b) mixing the textile scraps and the binder together in a ratio of 10-60% using a blender at a speed of 10-30 revolutions per minute for 5-20 minutes;
 c) crosslinking the mixture of textile scraps and binder in a mold by applying a compressive force of 3,000 to 6,000 psi at temperature of 80-180 degrees Celsius for 10-30 minutes;
 d) compressing the mixture of textile scraps and binder in a cold press with a compressive force of 3,000-6,000 psi for a period of 60-360 minutes and
 e) removing the composite material from the mold.

13. The method producing the molded composite material according to claim 12 including the further steps of:
 f) cutting the composite material into a desired size and shape; and
 g) finishing the surface of the composite material.

14. A molded composite material having a density of 950-1120 kg/m$^3$ comprising textile debris and a binder, the textile debris including fabric scraps, the binder including:

| | | |
|---|---|---|
| natural rubber latex | 100 | Parts |
| sulfur | 0-1.0 | Parts |
| zinc diethyldithiocarbamate | 0-1.0 | Parts |
| antioxidant agent | 0.1-1.0 | Parts |
| zinc oxide (ZnO) | 0-5.0 | Parts |
| stabilizer | 0-1.0 | Parts and |
| pH adjustment substance | 0.1-1.0 | Parts. |

15. The molded composite material according to claim 14 wherein the natural rubber latex comprises 30-65 percent rubber.

16. The molded composite material according to claim 14 wherein the binder is also includes a polymeric binder in the ratio of 10-70 parts per 100 natural rubber latex parts.

17. The molded composite material in accordance with claim 14 wherein the binder includes a filler selected from the group consisting of calcium carbonate, titanium dioxide and silica, the stabilizer comprises potassium Laurate (K laurate) and the pH adjustment substance comprises potassium hydroxide (KOH).

18. A method of producing a molded composite material according to claim 14 comprising the steps of:
 a) preparing textile scraps from textile debris by cutting the textile debris into specified sizes;
 b) mixing the textile scraps and the binder in a ratio of 10-60% by weight using a blender at a speed of 10-30 revolutions per minute for 5-20 minutes;
 c) reducing the moisture content of the combined textile scraps and binder to 0-5% using heating process;
 d) chopping the dried textile scraps and binder into small pieces into different fiber lengths in the range (a) 0.5-1.0 cm (b) 1.0-2.0 cm and (c) 2.0-3.0 cm;

e) mixing the chopped ingredients (a), (b) and (c) in an appropriate ratios to control the dispersion and adhesion of the fiber with the proportions (a):(b):(c) in the range between 1:1:1 to 1:2:4;

f) crosslinking the mixture of textile scraps and binder in a mold by applying a compressive force of 3,000 to 6,000 psi at temperature of 80-180 degrees Celsius for 10-30 minutes;

g) compressing the cross-linked mixture of textile scraps and binder in a cold press with a compressive force of 3,000-6,000 psi for a period of 60-360 minutes and h) removing the composite material from the mold.

19. A textile board formed of textile debris and a binder, the textile debris including fabric scraps, the binder including:

| natural rubber latex | 100 Parts |
| sulfur | 0-1.0 Parts |
| zinc diethyldithiocarbamate | 0-1.0 Parts |
| phenolic antioxidants or polymeric stherically hindered phenols (antioxidant agent) | 0.1-2.0 Parts |
| zinc oxide (ZnO) | 0-5.0 Parts |
| stabilizer | 0-1.0 Parts and |
| pH adjustment substance | 0.1-1.0 Parts | the textile debris and binder having been mixed and thereafter crosslinked in a mold at a temperature within a range of 80°-180° Celsius and compressed at a pressure within a range of 3000-6000 psi.

20. A composite material comprising textile debris and a binder, the textile debris including fabric scraps comprising small pieces having fiber lengths in the range of (a) 0.5-1.0 cm (b) 1.0-2.0 cm and (c) 2.0-3.0 cm with fiber ratio (a):(b):(c) is equal to 1:1:1 to 1:2:4, the binder including:

| natural rubber latex | 100 Parts |
| sulfur | 0-1.0 Parts |
| zinc diethyldithiocarbamate | 0-1.0 Parts |
| antioxidant agent | 0.1-1.0 Parts |
| zinc oxide (ZnO) | 0-5.0 Parts |
| stabilizer | 0-1.0 Parts and |
| pH adjustment substance | 0.1-1.0 Parts. |

* * * * *